United States Patent
Kanamori et al.

Patent Number: 5,179,614
Date of Patent: Jan. 12, 1993

[54] QUARTZ OPTICAL WAVEGUIDE AND METHOD FOR PRODUCING THE SAME

[75] Inventors: Hiroo Kanamori; Masumi Ito; Shinji Ishikawa; Haruhiko Aikawa; Sumio Hoshino, all of Yokohama, Japan

[73] Assignee: Sumitomo Electric Industries, Ltd., Osaka, Japan

[21] Appl. No.: 762,306

[22] Filed: Sep. 20, 1991

[30] Foreign Application Priority Data

Sep. 20, 1990 [JP] Japan ................................. 2-248794

[51] Int. Cl.$^5$ .............................................. G02B 6/10
[52] U.S. Cl. ..................................... 385/129; 65/3.11
[58] Field of Search ................................ 385/1-3, 385/129, 130, 132; 65/3.11, 4.2

[56] References Cited

U.S. PATENT DOCUMENTS 4,856,859  8/1989  Imoto ................................. 385/129
5,076,655 12/1991  Bridges ................................. 385/2

OTHER PUBLICATIONS

Kawachi, "Silica-Based Optical Waveguides and Their Application to Integrated-Optic Devices", Dec. 1989, pp. 681–686.

Primary Examiner—John D. Lee
Assistant Examiner—John Ngo
Attorney, Agent, or Firm—Cushman, Darby & Cushman

[57] ABSTRACT

A quartz optical waveguide comprising a substrate, a ridge-form core part formed on said substrate and a part which surrounds said core part and has a lower refractive index than that of said core part, wherein a refractive index changes continuously at an interface between said core part and said part having the lower refractive index, which has a decreased transmission loss and a connection loss when connected with an optical fiber.

2 Claims, 6 Drawing Sheets (PRIOR
SICE 4, TIC 4, etc.

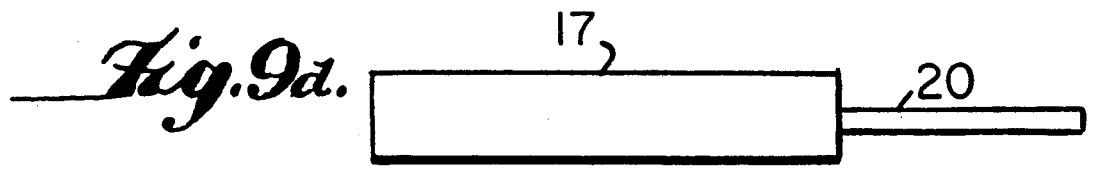
*Fig.9a.*
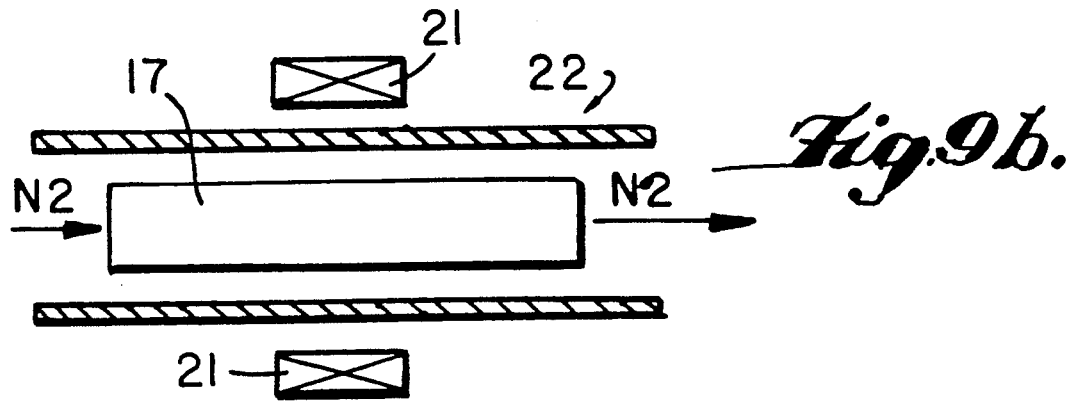
*Fig.9b.*
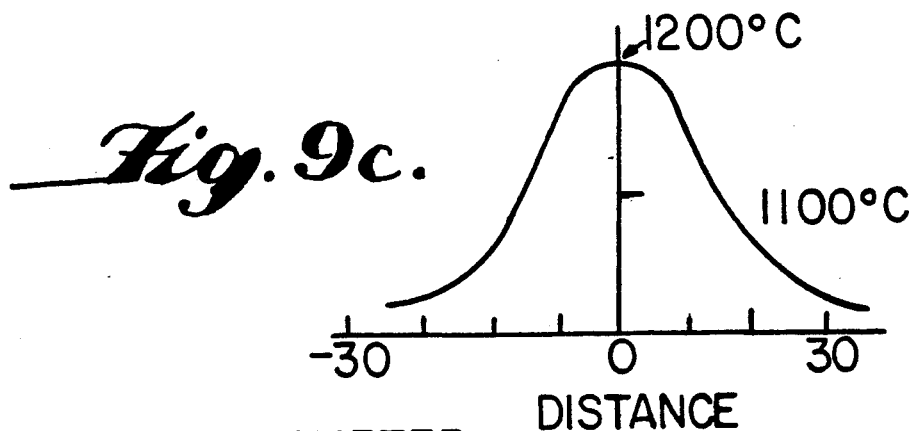
*Fig.9c.*
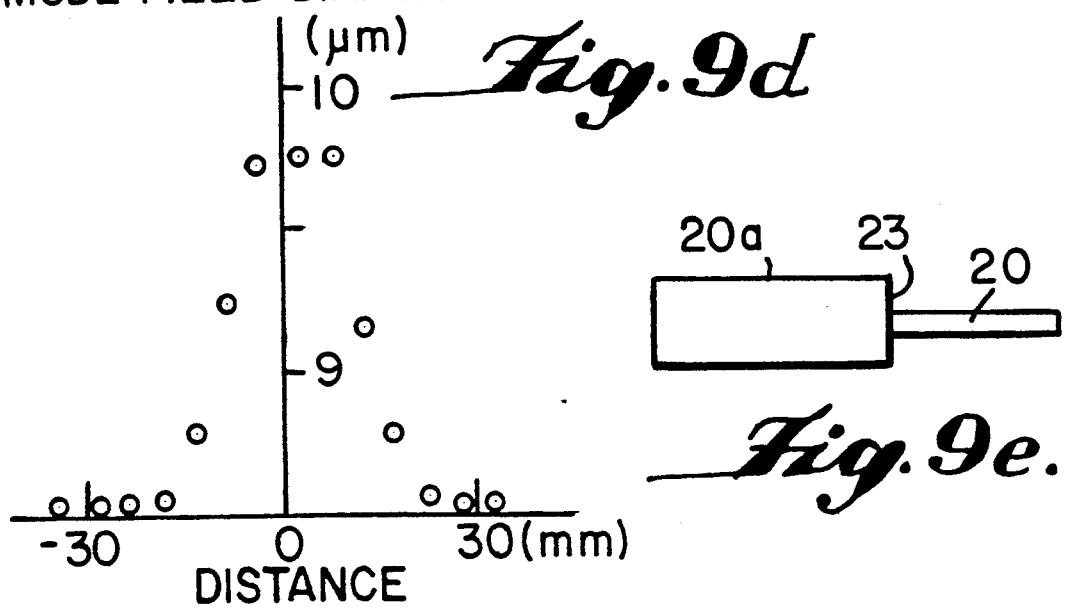
*Fig.9d*
*Fig.9e.*

QUARTZ OPTICAL WAVEGUIDE AND METHOD FOR PRODUCING THE SAME

BACKGROUND OF THE INVENTION

1. Field of the Invention

The present invention relates to a quartz optical waveguide which can reduce transmission loss of guided light and a method for producing the same.

2. Description of the Related Art

Among optical waveguides, a quartz optical waveguide comprising quartz glass attracts attentions since it has a low light transmission loss and can be connected with a quartz optical fiber with a low connection loss.

In general, such quartz optical waveguide is produced by a combined method of glass film formation by a flame hydrolysis deposition (FHD) and fine processing of the formed glass film by reactive ion etching (RIE) (cf. Masao Kawachi, "Quartz Optical Waveguides and Their Application in Integrated Optical Elements", OPTICS, 18 (12), December 1989, 681–686).

The above method for producing a quartz optical waveguide will be explained by making reference to FIG. 1.

As shown in FIG. 1A, a glass-forming raw material such as $SiCl_4$, $TiCl_4$ and the like are supplied to a burner 2 together with a fuel gas (e.g. hydrogen gas, oxygen gas, etc.) and hydrolyzed and oxidized in an oxyhydrogen flame 2 to form fine particles 3 (soot) of glass. The glass soot is then deposited on a substrate 4 such as a silicon wafer to successively form films of glass soot 5a and 5b which have different compositions from each other. The deposited glass films on the substrate 4 are vitrified by heating them at a high temperature to obtain a buffering layer 6a and a core layer 6b as shown in FIG. 1B.

The above method is FHD.

Then, by RIE, unnecessary parts of the core layer 6b are removed to remain a ridge-form core part 6c as shown in FIG. 1C. Again, by FHD, a cladding layer 6d is formed to surround the core part 6c to form an embedded type quartz optical waveguide 7 as shown in FIG. 1D.

Though the light transmission loss through the quartz optical waveguide has been reduced to about 0.1 dB/cm, its further decrease is desired since a light transmission loss through a quartz optical fiber has been reduced to 1 dB/km.

As quality of a device comprising optical waveguide has been much improved, a longer waveguide length is required. Then, it is an important object to further decrease the light transmission loss of the quartz optical waveguide.

The light transmission loss through the optical waveguide may be attributed to light scattering caused by irregular structures such as irregularities at an interface between a core part and a low refractive index part which surrounds the core part such as a cladding part or a buffering part.

The reason why the optical fiber has a much lower light transmission loss may be that, in the fabrication of the optical fiber, since a glass preform is once produced and it is drawn to a fiber having a diameter of, for example 125 μm, irregularities at an interface between the core part and the cladding or buffering part are smoothened during drawing so that such irregularities have no substantial influence on the light transmission loss in the fabricated optical fiber.

On the other hand, when the quartz optical waveguide is produced by the method which has been explained by making reference to FIG. 1, the irregular structures which are formed during the production of the optical waveguide remain. In particular, when the unnecessary parts of the core layer are removed in the RIE step, it is very difficult to make the side walls of the core sufficiently smooth and to make the width of the core uniform in the longitudinal direction.

FIG. 2 schematically shows refractive index profiles in the common optical waveguide, and the refractive index discontinuously changes at interfaces between the core part and the cladding layer and between the core part and the buffering layer, that is, the refractive index has a so-called step profile. Therefore, when the optical waveguide is connected with an optical element having a different mode field such as the optical fiber, the connection loss increases.

SUMMARY OF THE INVENTION

One object of the present invention is to provide a quartz optical waveguide which has a reduced light transmission loss.

Another object of the present invention is to provide a quartz optical waveguide which can reduce a connection loss when connected with an optical element having a different mode field from that of the optical waveguide.

A further object of the present invention is to provide a method for producing a quartz optical waveguide of the present invention.

According to a first aspect of the present invention, there is provided a quartz optical waveguide comprising a substrate, a ridge-form core part formed on said substrate and a part which surrounds said core part and has a lower refractive index than that of said core part, wherein a refractive index changes continuously at an interface between said core part and said part having the lower refractive index.

According to a second aspect of the present invention, there is provided a method for producing a quartz optical waveguide which comprises steps of forming a ridge form core part on a substrate, forming a part which has a lower refractive index than that of said core part to surround said core part to form a quartz optical waveguide, and heating said quartz optical waveguide so as to diffuse a component which changes a refractive index in said quartz optical waveguide.

BRIEF DESCRIPTION OF THE DRAWINGS

FIG. 9A shows a quartz optical waveguide and an optical fiber which are abutted with each other before heating the optical waveguide, FIG. 9B shows a cross section of a furnace for heating the optical waveguide in Example 3, FIG. 9C is a temperature profile in the furnace of FIG. 9B, FIG. 9D is a distribution of a mode field diameter of the optical waveguide after heating in Example 3, and FIG. 9E shows the quartz optical waveguide and the optical fiber which are abutted with each other after heating in Example 3.

DETAILED DESCRIPTION OF THE DRAWINGS

Figure 3:
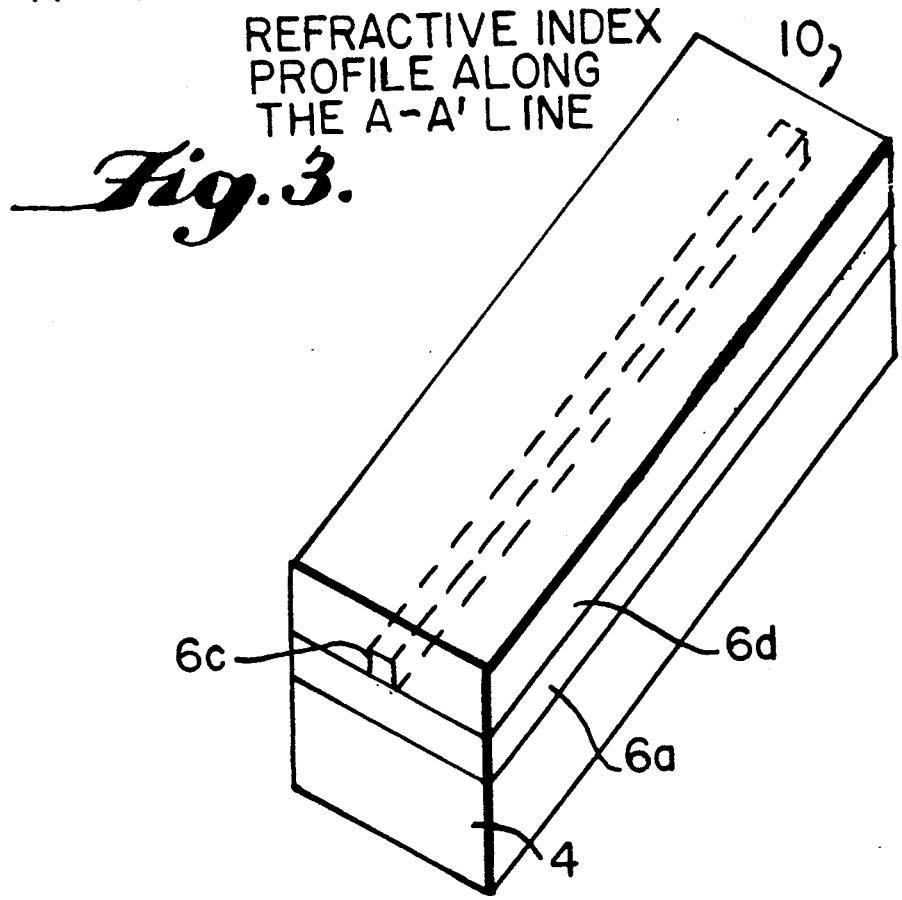
FIG. 3 shows a perspective view of an example of a quartz optical waveguide according to the present invention.

As shown in FIG. 3, one example of the quartz optical waveguide 10 of the present invention comprises a substrate 4, a ridge-form core part 6c and parts which surround the core part and have a lower refractive index than that of the core part, namely, a cladding layer 6d and a buffering layer 6a. This optical waveguide has refractive index profiles each of which continuously and smoothly changes in the form of a Gaussian distribution or an error-function distribution as shown in FIG. 4.

Figure 4:
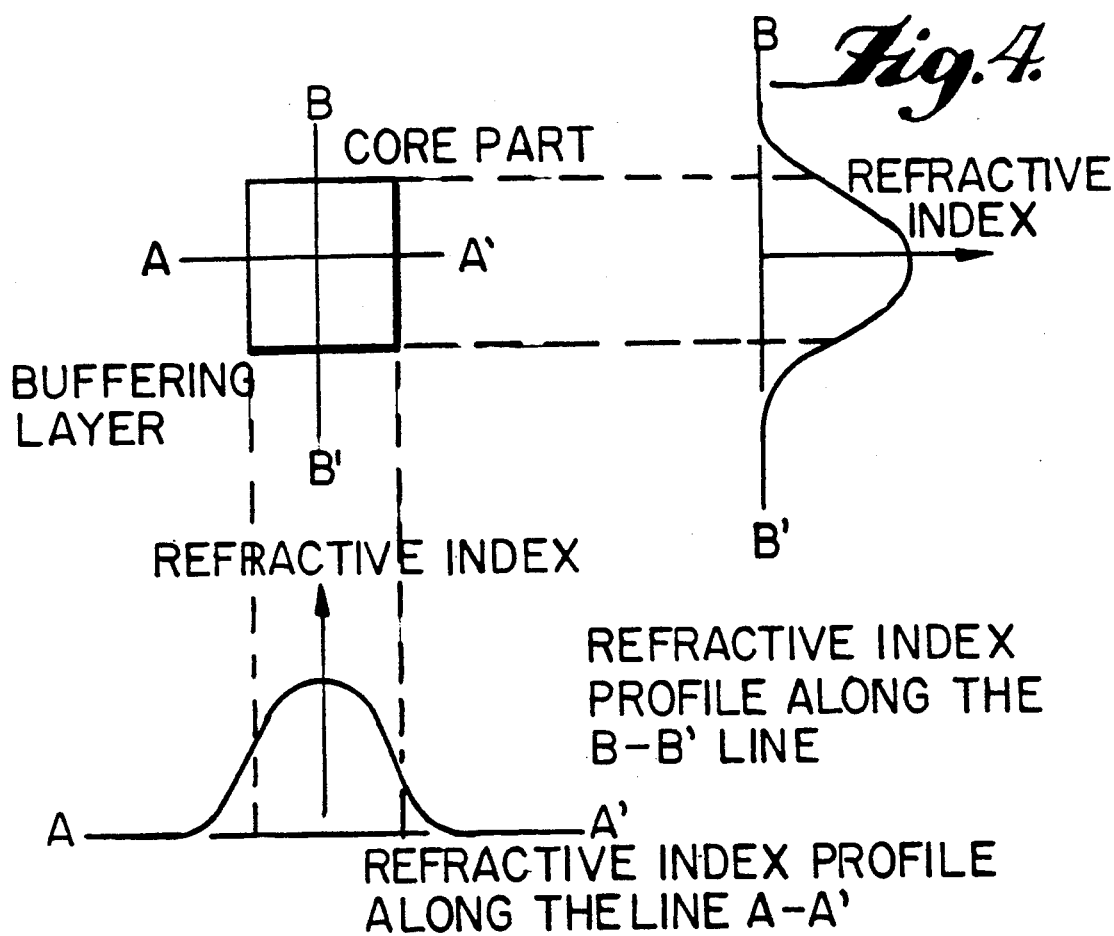
FIG. 4 shows a cross section and refractive index profiles of a quartz optical waveguide after heating.

If the quartz optical waveguide having the refractive index profiles of FIG. 4 is to be produced by the conventional method, it is possible to realize such refractive index profile in a direction perpendicular to the plane (the B-B' direction) by gradually changing a composition of the glass-forming raw material as time passes, but it is impossible to realize such refractive index profile in a direction parallel with the plane (the A-A' direction) since the unnecessary parts are cut away from the core layer in the perpendicular direction and then the cladding layer is formed around the remaining core part.

According to the present invention, the glass soot films 5a and 5b are formed on the substrate 4, they are vitrified to from the buffer layer 6a and the core layer 6b respectively, the unnecessary parts of the core layer 6b are removed by RIE to form the ridge core part 6c, and then the cladding layer 6d is formed to surround the core part 6c by the same method as the conventional method of FIG. 1. Thereafter, the produced quartz optical waveguide is heated to diffuse a component which changes the refractive index in the quartz optical waveguide to obtain the quartz optical waveguide 10 having the refractive index profiles as shown in FIG. 4.

Examples of the component which changes the refractive index are refractive index modifiers such as $GeO_2$ or F. In addition, a compound which can be easily diffused in the the quartz optical waveguide such as $TiO_2$, $P_2O_5$, $B_2O_3$ and the like may be used. $GeO_2$ and F are preferred since they have large diffusion rates in the quartz glass and no adverse influences on the light transmission loss.

Figure 1A:
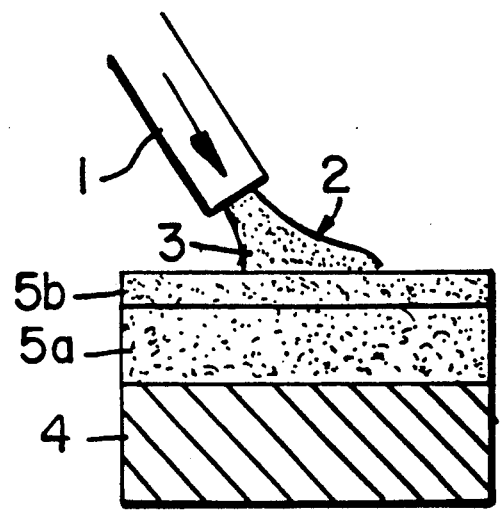
FIGS. 1A–1D schematically show the steps of the flame hydrolysis deposition method for producing a quartz optical waveguide.
Figure 1B:
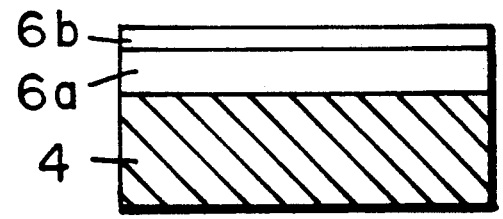
Figure 1C:
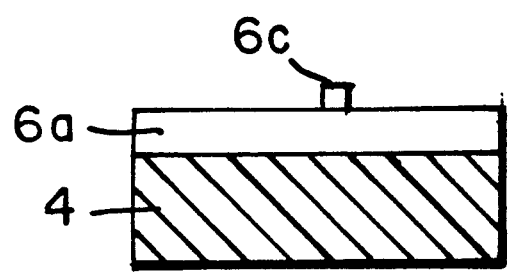
Figure 1D:
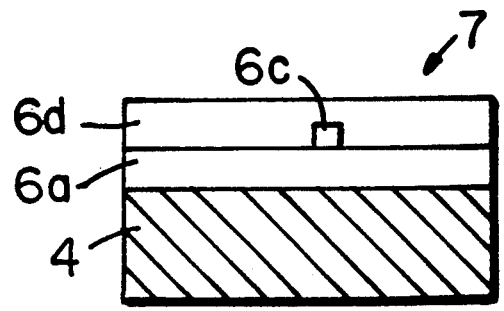
Figure 2:
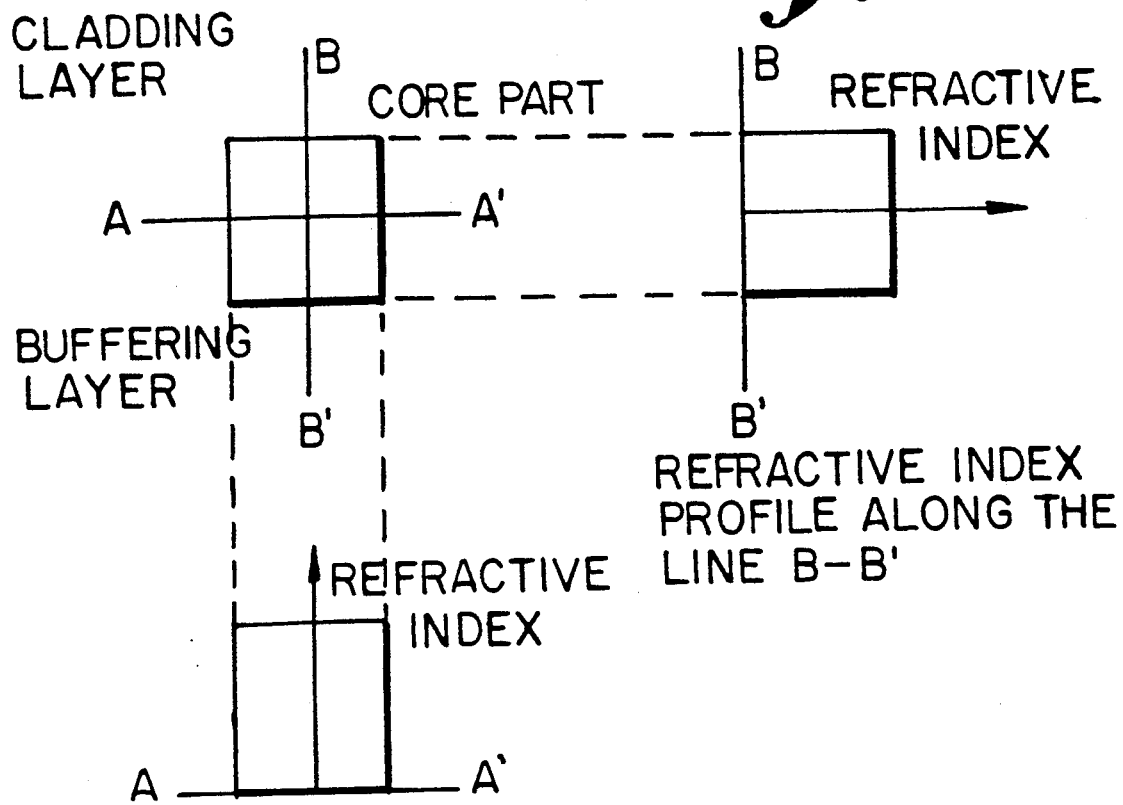
FIG. 2 shows a cross section and refractive index profiles of a conventional quartz optical waveguide.

When $GeO_2$ is used as the refractive index modifier, $GeCl_4$ is added to the glass-forming raw material comprising $SiCl_4$ during the glass soot synthesis step shown in FIG. 1A. Since synthesized $GeO_2$ quickly dissipates from the glass soot particles in the heating step, it is removed during the vitrification step and a part of the dissipated $GeO_2$ is redeposited on the buffering glass layer so that the buffering layer and the core layer may not be clearly distinguished. To overcome such defect, the buffering layer forming step and the core layer forming step should be separated. That is, after the buffer layer is formed and vitrified, the core layer containing $GeO_2$ is formed and vitrified.

When F is used as the refractive index modifier, since F lowers the refractive index of the quartz glass, it should be added to the lower refractive index parts such as the buffering layer and the cladding layer. The fluorine is added to the glass by heating the glass soot layer in an atmosphere containing fluorine to diffuse F in the glass soot layer rather than a fluorine-containing compound is added to the glass-forming raw material. The fluorine may be added to the glass prior to the vitrification step at a temperature slightly lower than a vitrification temperature or during the vitrification step.

In the present invention, it is possible to continuously change the mode field shape of the optical waveguide in the longitudinal direction by heating the optical waveguide part by part rather than heating the whole optical waveguide.

For example, to produce a core having a longer optical path in a limited space of a small substrate, it is necessary to bend the optical waveguide at a small curvature. In such case, to minimize a flexural loss, it is necessary to make the mode field of the optical waveguide as small as possible.

The optical waveguide is partly heated near its end which is connected to the optical fiber to diffuse the component which changes the refractive index so that a mode field diameter of such end part is enlarged to make the mode field diameter identical with that of the optical fiber, and the mode field diameter of the remaining part of the optical waveguide is gradually decreased towards the other end by reducing the degree of the diffusion of the component which changes the refractive index.

The partial heating of the optical waveguide can be easily done by using a temperature profile in an electric furnace as explained in the below described examples, though a $CO_2$ laser, a small-size electric furnace or a microtorch may be used.

PREFERRED EMBODIMENTS OF THE INVENTION

The present invention will be illustrated by following Examples.

EXAMPLE 1

Figure 5:
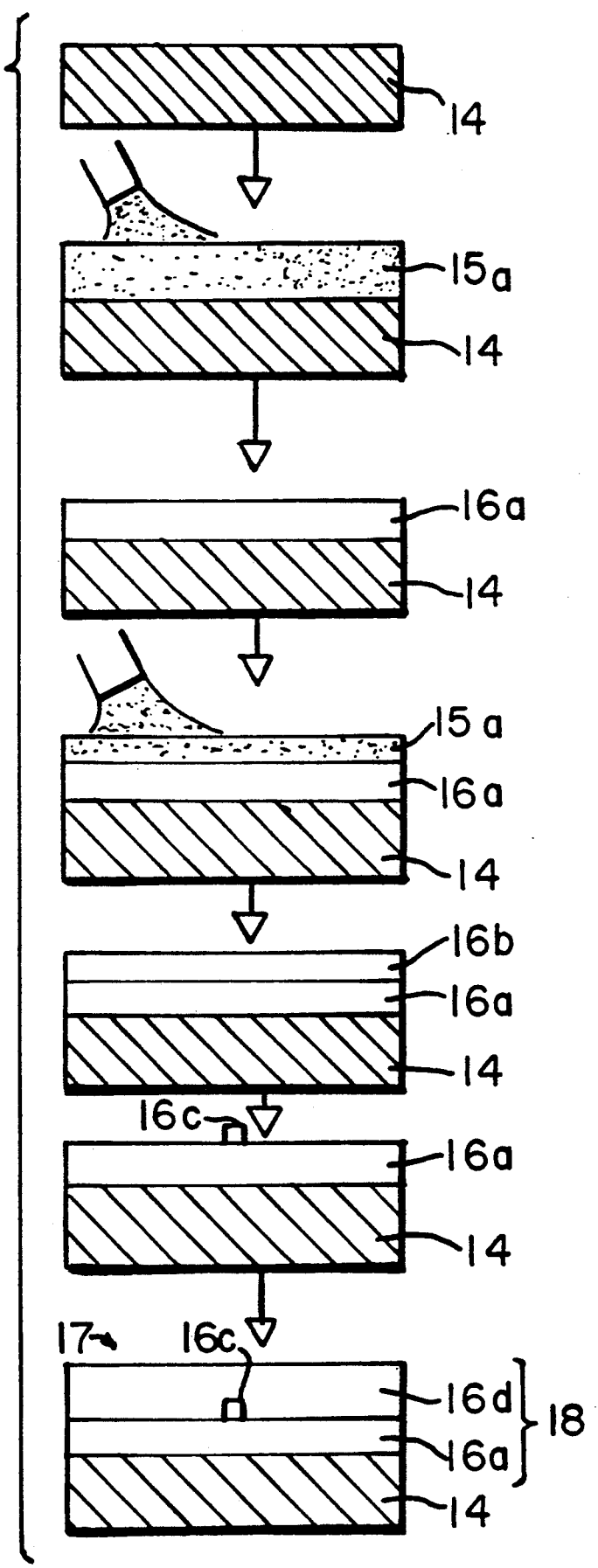
FIG. 5 shows steps of the production of a quartz optical waveguide according to the present invention.

The production steps will be explained by making reference to FIG. 5.

On a silicon substrate 14, a buffering glass soot layer 15a consisting of $SiO_2$-$P_2O_5$-$B_2O_3$ (contents of $P_2O_5$ and $B_2O_3$: 0.4 and 5% by mole) was formed by a flame deposition method. $P_2O_5$ and $B_2O_3$ were added to the glass by adding suitable amounts of $POCl_3$ and $BCl_3$ to $SiCl_4$ which was supplied to the oxyhydrogen burner. The glass soot layer 15a was heated at 1250° C. for 2 hours in an atmosphere of 90% of helium and 10% of oxygen to form a buffering layer 16a having a thickness of about 20 μm.

On the buffering layer 16a a core glass soot layer 15a consisting of $GeO_2$-$SiO_2$-$P_2O_5$-$B_2O_3$ (contents of $GeO_2$, $P_2O_5$ and $B_2O_3$: 0.6 and 5.5% by mole) was formed by the flame deposition method. $GeO_2$, $P_2O_5$ and $B_2O_3$ were added to the glass by adding suitable amounts of GeCl₄, POCl₃ and BCl₃ to SiCl₄ which was supplied to the oxyhydrogen burner.

Figure 6:
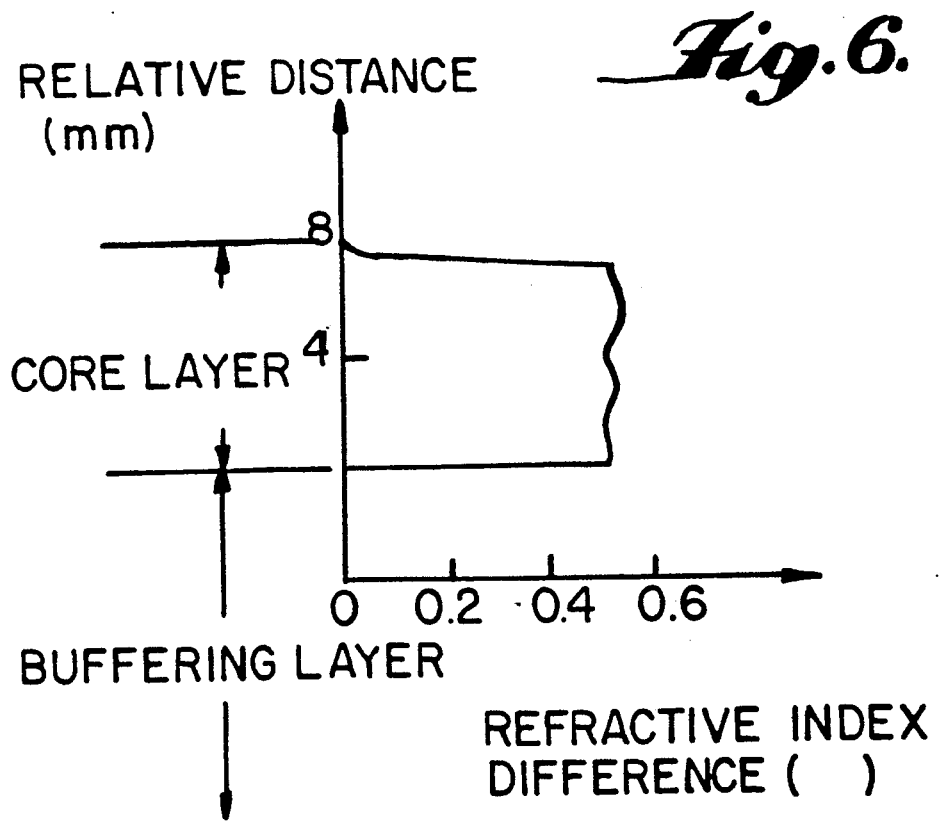
FIG. 6 shows a refractive index profile after forming a buffering layer and a core layer on a substrate in a direction perpendicular to a layer plane.

The core glass soot layer 15a was vitrified in the same manner as above to form a core layer 16b having a thickness of about 8 μm. A difference of the refractive index between the buffering layer 16a and the core layer 16b was 0.4%, and a refractive index profile in the thickness direction was as shown in FIG. 6, in which a relative distance was "0" (zero) at the interface between the core and the buffering layers.

Then, the core layer 16b was patterned by a lithographic method, and a ridge-form core part 16c having a cross section of 7 μm × 7 μm was formed by RIE. During RIE, a top layer of the core part having a varying refractive index was etched by a thickness of about 1 (one) μm from its surface. Accordingly, the refractive index in the core part 16c was 0.4% higher than that of the buffering layer 16a.

Finally, a cladding layer 16d having the same composition as the buffering layer was formed by the same FHD method and vitrified to obtain an embedded type quartz optical waveguide 17 comprising the ridge-form core part 16c having a cross section of 7 μm × 7 μm and the lower refractive index parts 18 consisting of the buffering layer 16a and the cladding part 6d.

The produced quartz optical waveguide had a light transmission loss of 0.15 dB/cm at a wavelength of 1.3 μm.

Figure 7:
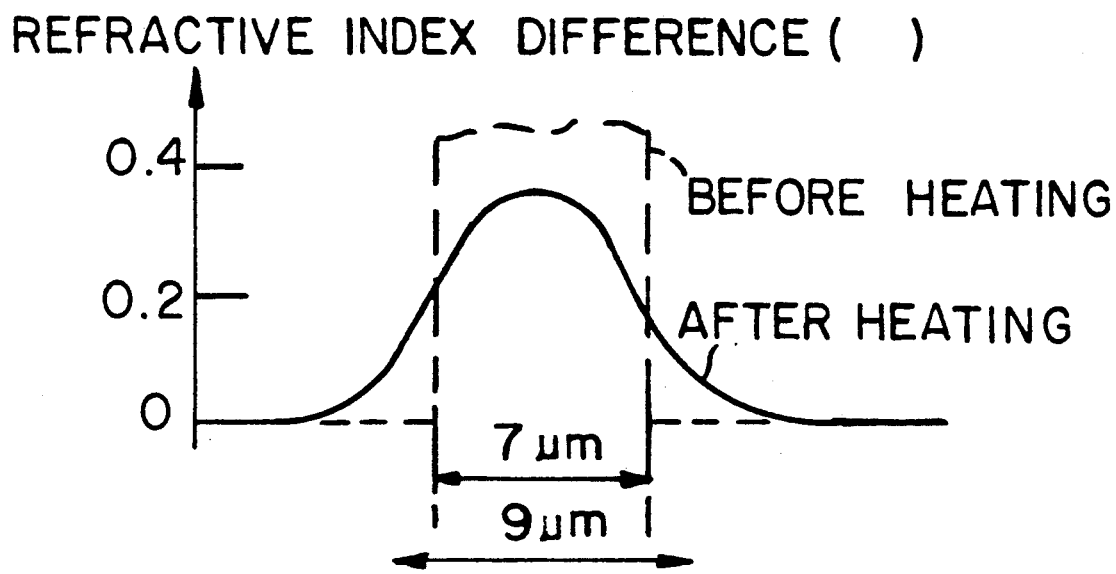
FIG. 7 shows refractive index profiles of a quartz optical waveguide produced in Example 1 before and after heating.

After heating the produced optical waveguide at 1200° C. for 12 hours in an inert gas atmosphere, the core diameter was enlarged to about 9 μm as shown in FIG. 7. The optical waveguide in this state had an improved light transmission loss of 0.09 dB/cm at the wavelength of 1.3 μm.

EXAMPLE 2

After forming the buffering glass soot layer 15a on the silicon substrate 14 in the same manner as in Example 1, the glass soot layer was vitrified by heating it at 1200° C. for 3 hours in an atmosphere of 80% of helium, 10% of SiF₄ and 10% of oxygen.

Then, a core glass soot layer 15b having the same composition as the above buffering glass soot layer 15a (before F addition) and heated at 1250° C. for 2 hours in an atmosphere of 90% of helium and 10% of oxygen to obtain a core layer 16b having a thickness of about 7 μm.

The formed buffering layer 16a had a thickness of 20 μm, and the fluorine was added to the buffering layer so that the refractive index of the buffering layer was 0.4% lower than that of the core layer.

Then, the core layer 16b was patterned by a lithographic method, and a ridge-form core part 16c having a cross section of 7 μm × 7 μm was formed by RIE.

Finally, a cladding layer 16d having the same composition as the buffering layer 16a was formed by the same flame deposition method and vitrified to obtain an embedded type quartz optical waveguide 17 comprising the ridge-form core part 16c having a cross section of 7 μm × 7 μm and the lower refractive index parts 18 consisting of the buffering layer 16a and the cladding part 6d.

The produced quartz optical waveguide had a light transmission loss of 0.2 dB/cm at a wavelength of 1.3 μm.

Figure 8:
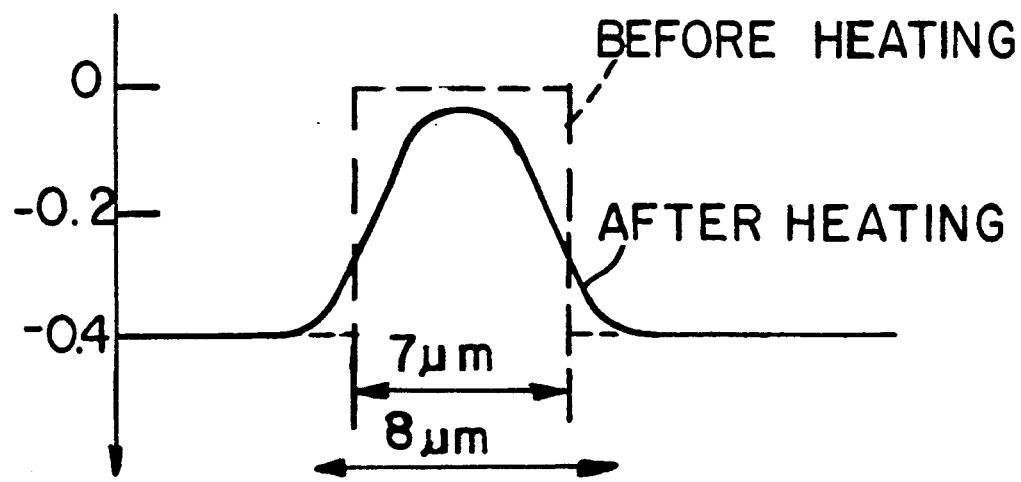
FIG. 8 shows refractive index profiles of a quartz optical waveguide produced in Example 2 before and after heating.

After heating the produced optical waveguide at 1200° C. for 4 days in an inert gas atmosphere, the core diameter was enlarged to about 8 μm as shown in FIG. 8. The optical waveguide in this state had an improved light transmission loss of 0.07 dB/cm at the wavelength of 1.3 μm.

EXAMPLE 3

In the same manner as in Example 1, a quartz optical waveguide 17 having the same sizes as those of the optical waveguide shown in FIG. 3 was produced. Then, as shown in FIG. 9A, one end surface of the optical waveguide 17 was abutted with an end surface of a single mode optical fiber 20 having a refractive index difference of 0.3% between a core and a cladding and a mode field diameter of 9.5 μm, and a connection loss was measured to be 0.2 dB at a wavelength of 1.3 μm.

Separately, the optical waveguide 17 was inserted in an electric furnace 22 having a pair of heaters 21, 21 as shown in FIG. 9B and placed at a center part of the furnace 22 having the maximum temperature. Then, the optical waveguide was heated with a maximum temperature of 1200° C. for 12 hours. A temperature profile in the furnace 22 is shown in FIG. 6C.

The heated optical waveguide had a continuously changing mode field diameter in the longitudinal direction as shown in FIG. 9D.

Then, the heated optical waveguide was cut into two parts at the center to form optical waveguides 20A. The heated end surface 23 of one of the optical waveguides 20A was abutted with the same single mode optical fiber as used in the above. A connection loss was decreased to lower than 0.1 dB at a wavelength of 1.2 μm.

What is claimed is:

1. A method for producing a quartz optical waveguide which comprises the steps of:
   forming a buffer layer on a substrate;
   forming a ridge form core layer on said buffer layer;
   forming a cladding layer on said buffer layer and ridge form core layer, said cladding layer and buffer layer each having a lower refractive index than that of said ridge form core layer; and
   heating to diffuse a component contained within at least one of said ridge form core layer, said cladding layer and said buffer layer which changes a refractive index of an interface between said ridge form core layer and said buffer and cladding layers, said refractive index of said interface varies continuously in a direction away from a center of said ridge form core layer.

2. The method according to claim 1, wherein only a part of said optical fiber is heated so as to continuously change a mode field shape in said optical waveguide.

* * * * *